Patented Dec. 14, 1943

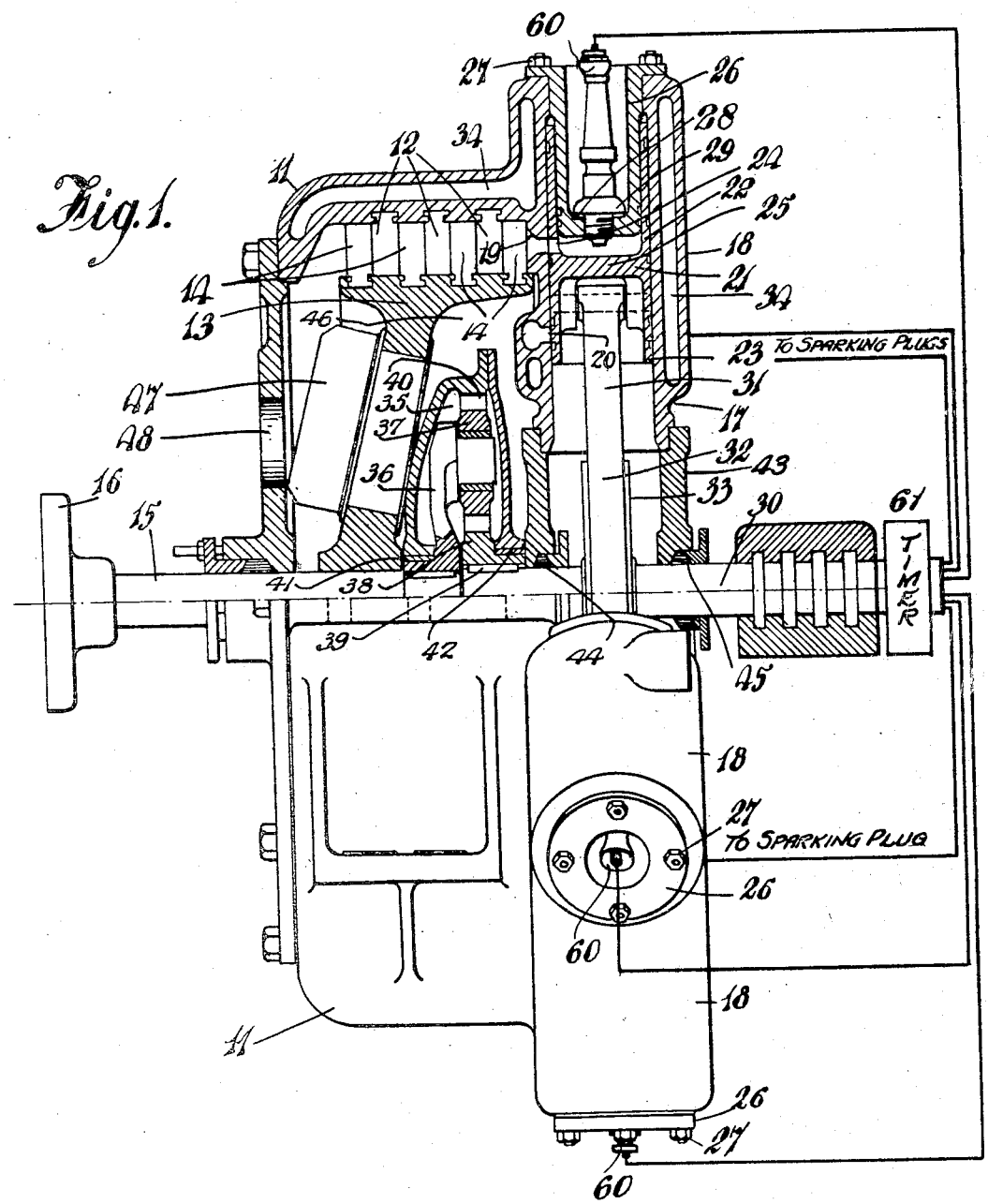

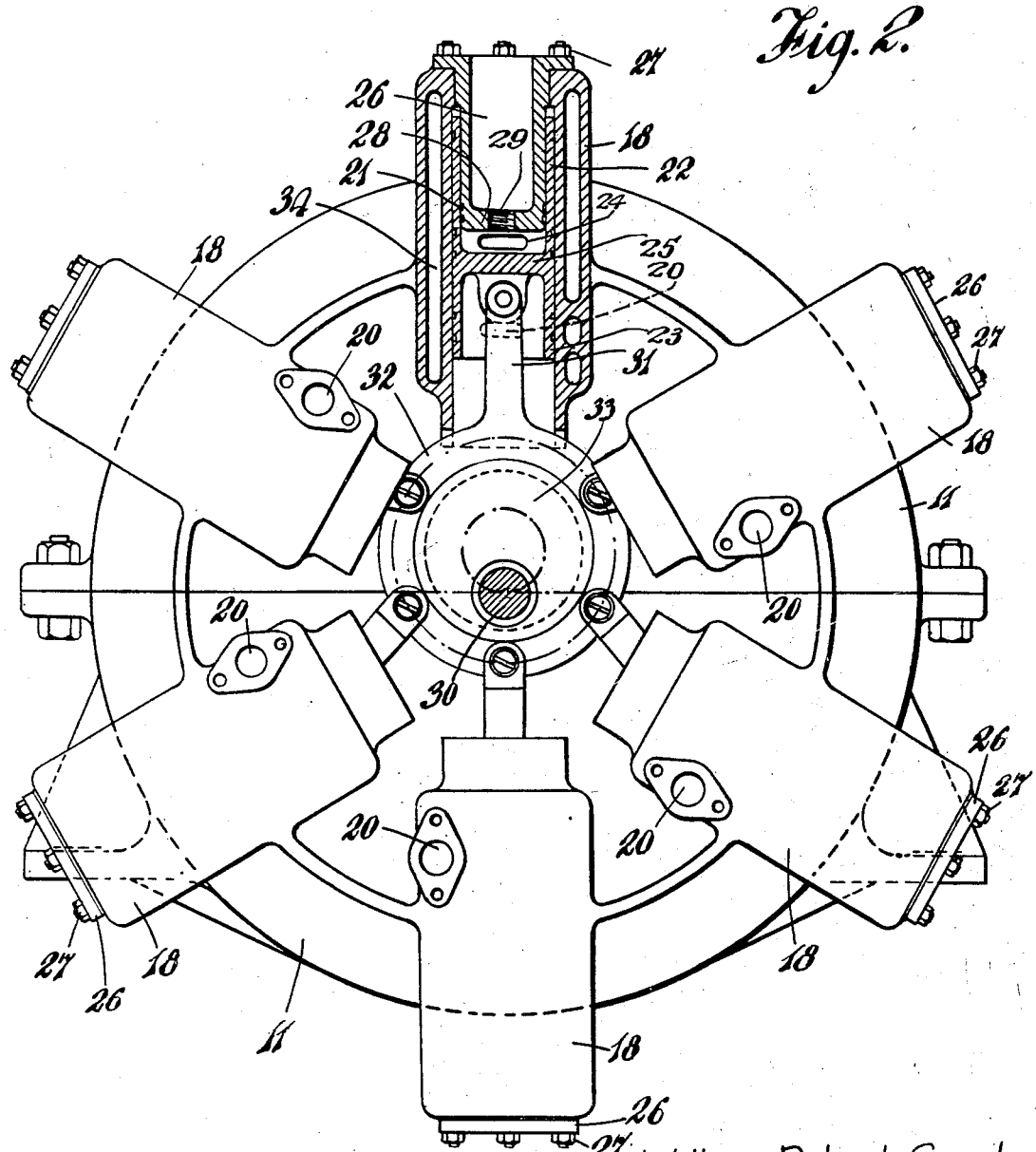

2,336,786

UNITED STATES PATENT OFFICE 2,336,786

INTERNAL COMBUSTION TURBINE ENGINE

William Robert Gunst, London, England, assignor of one-half to Hatim Attari, London, England Application January 19, 1940, Serial No. 314,628
In Great Britain January 12, 1939

5 Claims. (Cl. 60—13)

This invention relates to internal combustion turbine engines. The invention has for an object to provide for the efficient supply of pressure gas to the turbine, in a manner which may obviate any considerable heat losses.

Another object of the invention is to provide an engine which may develop a smoother torque that is possible with reciprocating piston and cylinder engines.

A further object of the invention is to provide an engine which may be light in weight so as to be particularly suitable for use in aircraft, whilst in preferred constructions an underlying principle resides in reducing the working parts to a minimum so as to obtain such lightness in structure.

An internal combustion turbine engine according to one embodiment of the invention is illustrated by the accompanying diagrammatic drawings, of which:

Figure 1 shows the engine in part sectional side elevation; and

Figure 2 is a corresponding end view also partly in section.

The engine shown comprises a turbine casing 11, provided internally with rows of fixed vanes 12, the rows being equally spaced around the inner periphery of the casing 11, and a rotor 13 rotatable within the casing 11, and carrying rows of vanes 14 which are interdigitated with those 12 on the casing 11. The rotor 13 is in the form of a spoked wheel fast upon the output shaft 15 from which the drive can be taken as by a coupling 16 to the member to be driven.

The rotor 13 is driven by pressure gases generated in a compressor indicated generally at 17. The compressor 17 comprises six cylinders 18 disposed in a common plane alongside the rotor 13, and each cylinder 18 extends radially of the rotor. Each cylinder 18 has an exhaust port 19 opening directly on to the vanes 14 of the rotor 13, and has an inlet port 20 disposed nearer the axis of the engine. Within each cylinder 18 is a reciprocating piston 21 which has an upwardly extending skirt 22 and a downwardly extending skirt 23 which serve to control the exhaust and inlet ports respectively. The skirt 22 has a port 24 just above the head 25 of the piston and this port registers with the exhaust port 19 when the piston is at its outer dead centre position at which the inlet port 20 is closed by the skirt 23. The skirt 22 is of such length that when the piston is at inner dead centre, the exhaust port 19 is closed by said skirt 22, whilst the inlet port 20 is opened by the port 24 in said skirt. The skirt 22 is slidable within an annular passage left between the wall of the cylinder 18 and a cylinder head 26 secured to the outer end of the cylinder by bolts and nuts 27. The cylinder-head 26 is hollow and at its lower end 28 has a threaded bore 29 for receiving a sparking plug 60 shown in Figure 1. The piston 21 is adapted to be reciprocated from a shaft 30 co-axial with the shaft 15, by connecting rods 31 connected with an eccentric strap 32 surrounding an eccentric 33. The cylinder 18 and also the vanes of the turbine are water cooled by water in the jacket 34 formed in the cylinder 18 and in the turbine casing 11.

The rotor 13 is drivingly connected with the shaft 30 through reduction gearing indicated generally at 35. The reduction gearing comprises a planet carrier 36 keyed on to the shaft 15 and carrying a number of planet pinions, one of which is shown at 37. The planets 37 constantly mesh with a sun pinion wheel 38 keyed to the shaft 30 at 39, and also with an internally toothed annulus 40 having sealed bearings 41 and 42 on the planet carrier 36 and sun pinion 38 respectively. The crank case 43 of the compressor is sealed by stuffing boxes and glands 44 and 45.

The operation of the engine is as follows: As the piston moves inward from the position shown in Figure 1, the exhaust port 19 is closed and a partial vacuum is created above the piston head 25. Mixture is admitted to the space above the piston directly the port 24 comes into register with the port 20 and the upward stroke of the piston compresses the charge which is fired by the sparking plug 60 which is controlled by the timer 61 to spark as the port 24 returns into register with the exhaust port 19 through which the exploded charge passes across the turbine vanes 12 and 14 to drive the rotor 13. Rotation of the rotor 13 is imparted to the crank shaft 30 through the reduction gearing, the ratio of which latter will depend upon the size of engine. For example, the rotor 13 may operate at as high a speed as 12,000 to 16,000 revolutions per minute, whilst the compressor driving shaft 30 is rotated at about 3,000 to 4,000 revolutions per minute, so that a four to one reduction gear is effected between the turbine rotor 13 and the crank shaft 30.

As some of the gases may escape past the edge of the rotor 13 into the space 46 between the rotor and the compressor, the rotor 13 may carry vanes 47 which serve to direct the gases which may find their way into the space 46 between the spokes of the rotor and out through the main exhaust outlet 48, to which an exhaust pipe may be connected.

It will be understood that the compressor may be of the pressure ignition type, so that air alone is supplied to the cylinder at the inner dead centre, the fuel being injected in known manner towards outer dead centre.

Any known or convenient kind of reduction gear may be employed for connecting the rotor with the compressor driving shaft.

High grade alloy steel or other suitable material is used in the construction where necessary for withstanding the high temperatures of combustion, and also for reducing wear in the admission ports to the turbine chamber and of the turbine blades themselves.

What I claim is:

1. In an internal combustion turbine engine, a turbine comprising a stator having a plurality of transverse rows of turbine vanes and a rotor within the stator having a plurality of transverse rows of vanes interdigitated with those of the stator, a plurality of radially-extending combustion chambers disposed immediately adjacent one side of the turbine, a piston reciprocable in each combustion chamber, an exhaust port extending through the wall of each combustion chamber in a direction at right-angles to the axis of said combustion chamber to discharge directly on to the adjacent rotor vanes, each piston having an outwardly-directed axial skirt defining with said piston and the head of its associated cylinder a combustion chamber, and a port through said skirt registering at an inner dead-centre position with an inlet port through the associated cylinder wall to said combustion chamber for charging the latter, and, at an outer position with said exhaust port, and means for timing the explosion of the entrapped charge to occur when the port through the skirt is in registry with the exhaust port for directing the explosion forces to operate directly upon the adjacent rotor vanes.

2. In an internal combustion turbine engine, a turbine comprising a stator having a plurality of transverse rows of turbine vanes, and a rotor within the stator having a plurality of transverse rows of vanes interdigitated with those of the stator, a plurality of radially-extending combustion chambers disposed adjacent one side of the turbine, a piston reciprocable in each combustion chamber, and an exhaust port extending through the wall of each combustion chamber in a direction at right-angles to the axis of said combustion chamber to discharge directly on to the adjacent rotor vanes, each piston having a skirt extending axially inwards and a skirt extending axially outwards from the piston head, the latter skirt defining with said piston and the cylinder head a combustion chamber, and a port through each outwardly-extending skirt registering at its inner dead-centre position with an inlet port through the associated cylinder wall to said combustion chamber, and, at an outer position with said exhaust port, said skirt operating to seal the ports at all times except at the said inner and outer position of their pistons to permit charging of each combustion chamber at said bottom dead-centre, and means for timing the explosion of the entrapped charge to occur when the port through the skirt is in registry with the exhaust port for directing the explosion forces to operate directly upon the adjacent rotor vanes.

3. In an internal combustion turbine engine, a turbine comprising a stator having a plurality of transverse rows of turbine vanes and a rotor within the stator having a plurality of transverse rows of vanes interdigitated with those of the stator, a plurality of radially-extending combustion chambers disposed immediately adjacent one side of the turbine, a piston reciprocable in each combustion chamber, an exhaust port extending through the wall of each combustion chamber in a direction at right-angles to the axis of said combustion chamber to discharge directly on to the adjacent rotor vanes, each piston having an outwardly-directed axial skirt defining with said piston and the head of its associated cylinder a combustion chamber, and a port through said skirt registering at an inner dead-centre position with an inlet port through the associated cylinder wall to said combustion chamber for charging the latter, and, at an outer position with said exhaust port, and means for timing the explosion of the entrapped charge to occur when the port through the skirt is in registry with the exhaust port for directing the explosion forces to operate directly upon the adjacent rotor vanes, and reduction gearing connecting the turbine rotor with said driving shaft, the reduction gearing comprising a sun wheel fast on said shaft, planet wheels in constant mesh with said sun wheel and mounted on a carrier rotatable as one with the rotor, and in constant mesh with a floating internally toothed annulus.

4. In an internal combustion turbine engine, a turbine comprising a stator having a plurality of transverse rows of turbine vanes and a rotor within the stator having a plurality of transverse rows of vanes interdigitated with those of the stator, a plurality of radially-extending combustion chambers disposed immediately adjacent one side of the turbine, a piston reciprocable in each combustion chamber, an exhaust port extending through the wall of each combustion chamber in a direction at right-angles to the axis of said combustion chamber to discharge directly on to the adjacent rotor vanes, each piston having an outwardly-directed axial skirt defining with said piston and the head of its associated cylinder a combustion chamber, and a port through said skirt registering at an inner dead-centre position with an inlet port through the associated cylinder wall to said combustion chamber for charging the latter, and, at an outer position with said exhaust port, and means for timing the explosion of the entrapped charge to occur when the port through the skirt is in registry with the exhaust port for directing the explosion forces to operate directly upon the adjacent rotor vanes, each chamber having a hollow cup-shaped cylinder head, spaced from the wall of said chamber, the outwardly extending skirt of said piston entering said space during the outward movement of said piston.

5. In an internal combustion turbine engine, a turbine comprising a stator having a plurality of transverse rows of turbine vanes, and a rotor within the stator having a plurality of transverse rows of vanes interdigitated with those of the stator, a plurality of radially-extending combustion chambers disposed adjacent one side of the turbine, a piston reciprocable, in each combustion chamber, and an exhaust port extending through the wall of each combustion chamber in a direction at right-angles to the axis of said combustion chamber to discharge directly on to the adjacent rotor vanes, each piston having a skirt extending axially inwards and a skirt extending axially outwards from the piston head, the latter skirt defining with said piston and the cylinder head a combustion chamber, and a port through each outwardly-extending skirt registering at its inner dead-centre position with an inlet port through the associated cylinder wall to said combustion chamber, and, at an outer position with said exhaust port, said skirt operating to seal the ports at all times except at the said inner and outer position of their pistons to permit charging of each combustion chamber at said bottom dead-centre, and means for timing the explosion of the entrapped charge to occur when the port through the skirt is in registry with the exhaust port for directing the explosion forces to operate directly upon the adjacent rotor vanes, each chamber having a depressed cylinder head spaced from the wall of said chamber, the outwardly extending skirt of said piston entering said space during the outward movement of said piston.

WILLIAM ROBERT GUNST.